United States Patent
Adachi et al.

(10) Patent No.: US 7,513,626 B2
(45) Date of Patent: Apr. 7, 2009

(54) LIGHT SOURCE DEVICE AND PROJECTION VIDEO DISPLAY DEVICE HAVING THE SAME

(75) Inventors: Takaharu Adachi, Daito (JP); Tadashi Renbutsu, Kasai (JP); Shoji Okazaki, Higashiosaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 495 days.

(21) Appl. No.: 11/315,588

(22) Filed: Dec. 23, 2005

(65) Prior Publication Data

US 2006/0164843 A1 Jul. 27, 2006

(30) Foreign Application Priority Data

Dec. 24, 2004 (JP) ............................. 2004-372703

(51) Int. Cl.
- G03B 21/16 (2006.01)
- G03B 21/28 (2006.01)
- F21V 7/20 (2006.01)
- F21V 29/00 (2006.01)

(52) U.S. Cl. ............................. 353/60; 353/61; 353/98; 362/218; 362/294; 362/345; 362/373

(58) Field of Classification Search .................. 353/60, 353/52, 61, 98; 362/341, 218, 294, 345, 362/373

See application file for complete search history.

(56) References Cited

U.S. PATENT DOCUMENTS 6,481,854 B1  11/2002  Sugawara et al.
6,902,275 B2 *  6/2005  Yamada et al. ................ 353/61
2002/0021415 A1  2/2002  Fujimori et al.
2004/0114113 A1  6/2004  Yamada et al.

FOREIGN PATENT DOCUMENTS

| JP | 09304835   | 5/1996  |
| JP | 9-304835   | 11/1997 |
| JP | 10-023355  | 1/1998  |
| JP | 2005-265872 | 9/2005 |

OTHER PUBLICATIONS

European Search Report dated Jan. 27, 2006.
Chinese Office Action dated May 23, 2008, Application No. 200510120270.7.

* cited by examiner

*Primary Examiner*—Diane I Lee
*Assistant Examiner*—Magda Cruz
(74) *Attorney, Agent, or Firm*—Westerman, Hattori, Daniels & Adrian, LLP.

(57) ABSTRACT

A light source device (18) includes a light source (1) constructed by a light emitter (1a) surrounded by a reflector (2); and a supporting member (20) for holding the reflector (2), and passages of cooling air are formed above and below the reflector (2). First and second openings (21b) and (21a) as passages of cooling air are opened in upper and lower portions, respectively, of the reflector (2). Near the opening (21a) on the lower side, a wind direction switching member (23) is disposed on the supporting member (20). The wind direction switching member (23) makes cooling air from the opening (21a) flow upward to a side of the light emitter (1a) in a state where the supporting member (20) is placed on a desk, and makes the cooling air flow directly to an upper portion of the light emitter (1a) via the opening (21a) in a state where the supporting member (20) is hung from a ceiling.

4 Claims, 15 Drawing Sheets

F I G. 1
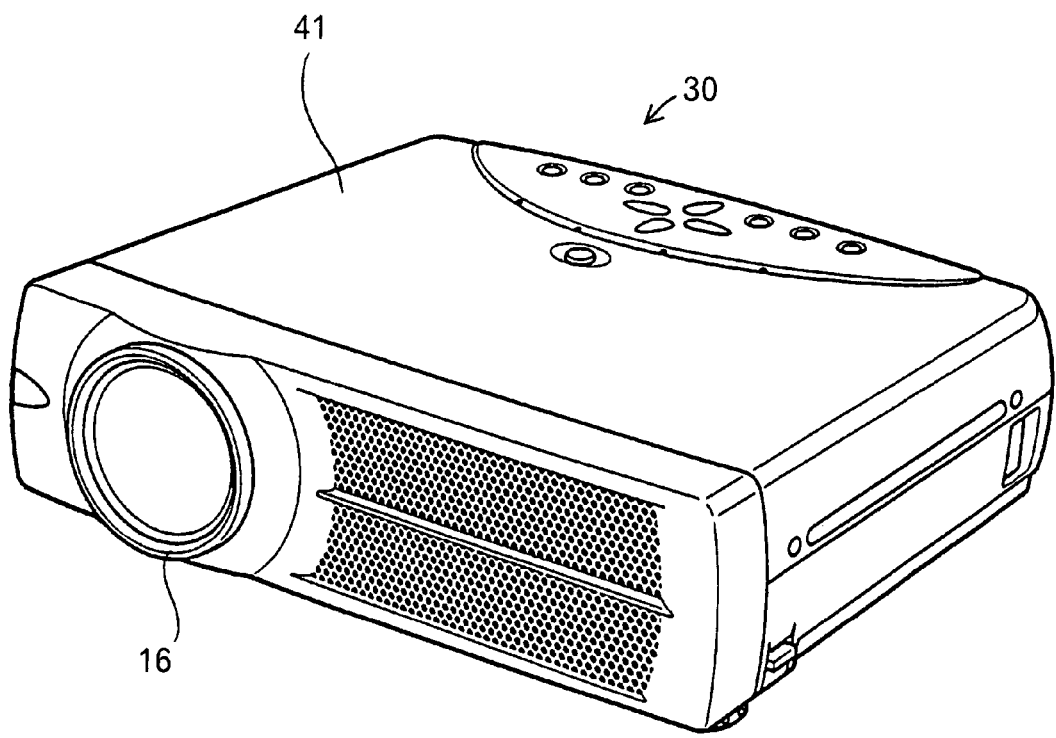

(a)

(b)

LIGHT SOURCE DEVICE AND PROJECTION VIDEO DISPLAY DEVICE HAVING THE SAME

BACKGROUND OF THE INVENTION

1. Field of the Invention

The present invention relates to a light source device having a configuration of cooling a light emitter and a projection video display device, such as a liquid crystal projector, having the light source device.

2. Background of the Invention

A projection video display device of this kind emits light from a light source and projects an image of a liquid crystal light valve onto a screen 67. The device may be used by mounting a body case 41 on a desk 68 or the like as shown in FIG. 16A or by hanging the body case 41 which is turned upside down from a ceiling 69 as shown in FIG. 16B. An image projected is corrected so as to be upside down by a circuit in the body case 41 and formed correctly.

FIG. 17 is a sectional side elevation showing a light source 1 of a conventional projection video display device, and FIGS. 18 and 19 are front views taken along line C-C of FIG. 17 (See Japanese Laid-Open Patent Application No. H9-304835). The light source 1 is constructed by surrounding a light emitter 1a by a reflector 2. Since the temperature of the light emitter 1a becomes high during emission of light, it is necessary to cool the light emitter 1a with air. Generally, heated air rises, so that an upper portion of the light emitter 1a becomes hotter than a lower portion. The position of the light source 1 changes between the state where the device is mounted on the desk and the state where the device is hung from the ceiling. Therefore, a mechanism for concentratedly cooling the upper portion of the light emitter 1a in both of the states is conventionally proposed.

As shown in FIG. 17, in a body case 41 of the projection video display device, a first air passage 45 as an upper air passage to the light source 1 and a second air passage 46 as a lower air passage are formed, and a first movable fin 9 and a second movable fin 90 are disposed so as to be swingable in a plane almost orthogonal to an optical axis L in correspondence with the first and second air passages 45 and 46, respectively. As shown in FIG. 18, the movable fins 9 and 90 each have a shutter plate 92 for closing the air passage 45 at an end of a coupling rod 91 and a weight 26, and a center portion in the longitudinal direction of the coupling rod 91 is supported by a pivot 93 in the body case 41. On the swing passage of each of the movable fins 9 and 90, first and second stoppers 94 and 95 are respectively disposed.

In a state where the body case 41 is placed on a desk, as shown in FIG. 18, the first movable fin 9 tilts due to the weight 26 until it comes into contact with the first stopper 94 around the pivot 93 as a center, and the shutter plate 92 is deviated from the first air passage 45. Air flows from the first air passage 45 into the light source 1 to cool down the upper portion of the light emitter 1a. On the other hand, the second movable fin 90 descends due to the weight 26 and enters a horizontal state in which the coupling rod 91 is in contact with the second stopper 95, and the shutter plate 92 closes the second air passage 46. Air from the first air passage 45 is exhausted from a through hole 42 opened in a side face of the body case 41.

In a state where the body case 41 is hung from a ceiling, the posture of the device is as shown in FIG. 19, that is, upside down of the posture shown in FIG. 18. The second movable fin 90 allows an inflow of air from the second air passage 46, and the first movable fin 9 checks an inflow of air from the first air passage 45, thereby cooling an upper portion of the light emitter 1a.

In the device, however, it is necessary to dispose the movable fins 9 and 90 above and below the light emitter 1a, so that the size of the device as a whole is large.

SUMMARY OF THE INVENTION

An object of the present invention is to concentratedly cool an upper portion of the light emitter 1a in both of the desktop state and the ceiling hung state of a device with a simple configuration.

A light source device includes a light emitter 1a, a reflector 2 covering the light emitter 1a, and a supporting member 20 for holding the reflector 2, and passages of cooling air are formed above and below the reflector 2.

First and second openings 21b and 21a as passages of cooling air are opened in upper and lower portions, respectively, of the reflector 2, a wind direction switching member 23 is disposed swingably on the supporting member 20 in a plane almost orthogonal to an optical axis L of the light emitter 1a near the opening 21a on the lower side, and the wind direction switching member 23 has a switching function of making cooling air from the opening 21a flow upward to a side of the light emitter 1a in a state where the supporting member 20 is placed on a desk, and making the cooling air flow directly to an upper portion of the light emitter 1a via the opening 21a in a state where the supporting member 20 is hung from a ceiling.

The wind direction switching member 23 comprises a wind direction plate 28 which swings in a plane almost orthogonal to the optical axis L of the light emitter 1a and guides cooling air, and a weight 26 connected to the wind direction plate 28, and the wind direction plate 28 swings together with the weight 26 according to whether the supporting member 20 is placed on a desk or hung from a ceiling.

EFFECT OF THE INVENTION

In the state where the device is placed on a desk, the wind direction plate 28 the wind direction switching member 23 tilts so that the tip faces the inside of the supporting member 20 due to the weight 26. The cooling air entered the device flows obliquely upward toward the side of the light emitter 1a along the wind direction plate 28. The cooling air turns around the light emitter 1a to concentratedly cool an upper portion of the light emitter 1a.

In a state where the device is hung from a ceiling, the wind direction plate 28 in the desktop state swings in a plane almost orthogonal to the optical axis L due to the weight 26. The cooling air flowed in the device flows downward and enters the reflector 2 without being guided to the wind direction plate 28. The cooling air concentratedly cools the upper portion of the light emitter 1a.

Therefore, with a simple configuration that the wind direction plate 28 is swung by the weight 26 in accordance with the posture of the device, the upper portion of the light emitter 1a which tends to overheat can be concentratedly cooled down in both of the state where the device is placed on a desk and the state where the device is hung from a ceiling.

Overheating of the light emitter 1a causes blowout, opacity, and shortening of the life of the light emitter 1a. On the contrary, overcooling of the light emitter 1a causes blackening and deterioration in brightness. In the present invention, the upper portion of the light emitter 1a is concentratedly cooled and the lower portion of the light emitter 1a is not overcooled, so that problems such as blowout and blackening of the light emitter 1a do not occur.

BRIEF DESCRIPTION OF THE DRAWINGS

FIG. 1 is a perspective view of a projection video display device as an embodiment of the present invention;

DETAILED DESCRIPTION OF PREFERRED EMBODIMENTS

An embodiment of the present invention will be described in detail hereinbelow with reference to the drawings.

Figure 14:
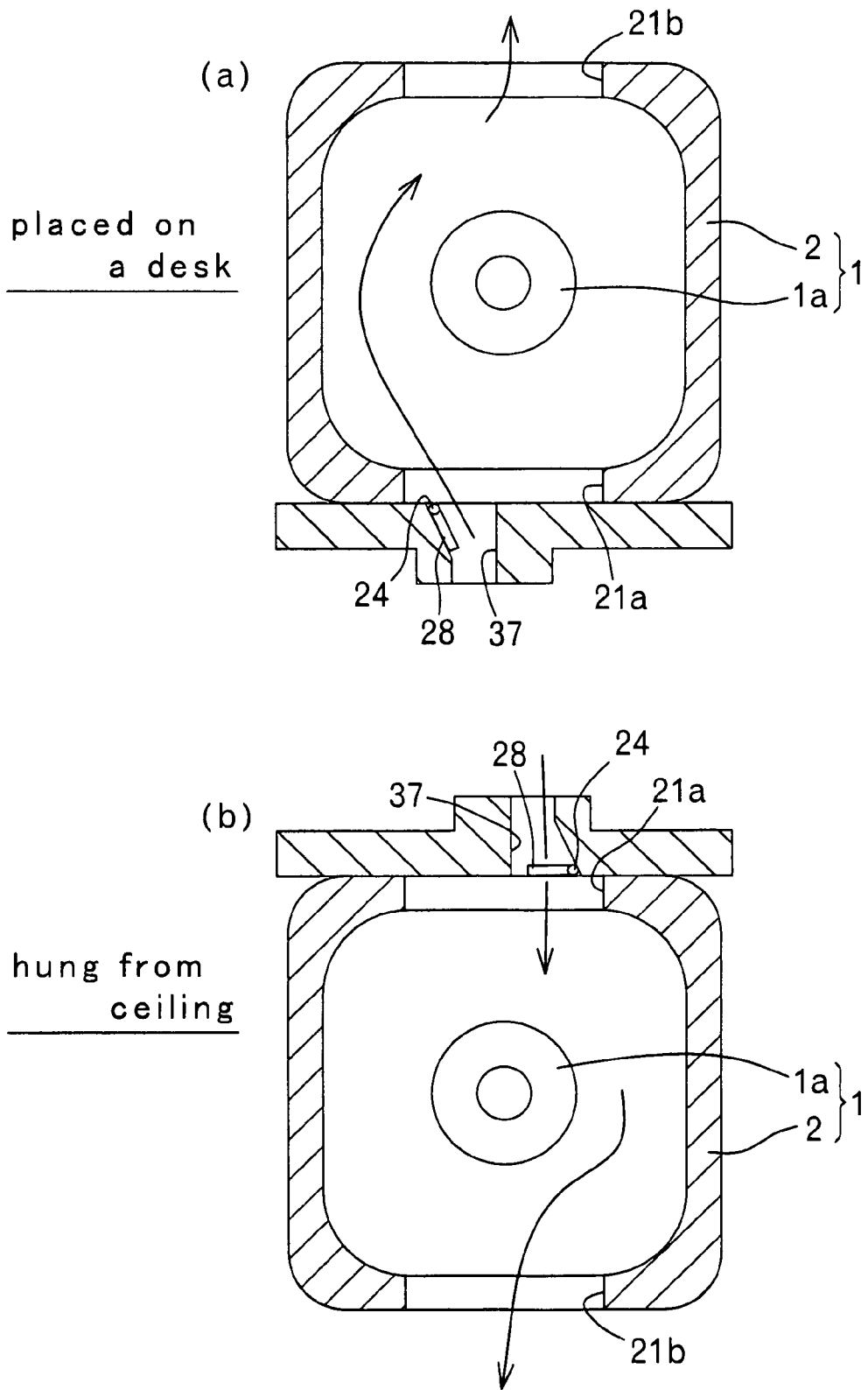
FIGS. 14A and 14B are diagrams showing a state where the device is placed on a desk and a state where the device is hung from the ceiling, respectively, each briefly illustrating operation of the wind direction plate of the present invention.

The characteristics of the present invention are briefly shown in FIGS. 14A and 14B. In the reflector 2 housing the light emitter 1a, a first opening 21b on the upper side and a second opening 21a on the lower side in a state where the device is placed on a desk are open. On the out side of the second opening 21a, a wind direction plate 28 is disposed so as to be swingable around a support shaft 24 as a center.

In a state where the device is placed on a desk, as shown in FIG. 14A, the wind direction plate 28 tilts to upwardly guide air flowing in from the second opening 21a to a side of the light source 1. The air turns around the light emitter 1a to cool an upper portion of the light emitter 1a and goes out from the first opening 21b.

In a state where the device is hung from a ceiling, as shown in FIG. 14B, the wind direction plate 28 becomes almost horizontal, so that air flowing in from the second opening 21a directly cools an upper portion of the light emitter 1a without being guided to the wind direction plate 28. That is, in both of the state where the device is placed on a desk and the state where the device is hung from a ceiling, an upper portion of the light emitter 1a can be concentratedly cooled down. In the following, a general configuration of the device will be described first.

[General Configuration]

FIG. 1 is a perspective view of a projection video display device according to the embodiment and shows a liquid crystal projector 30. In the body case 1, an optical system 42 extending from a light source device 18 which will be described later to a projection lens 16 is disposed.

Figure 2:
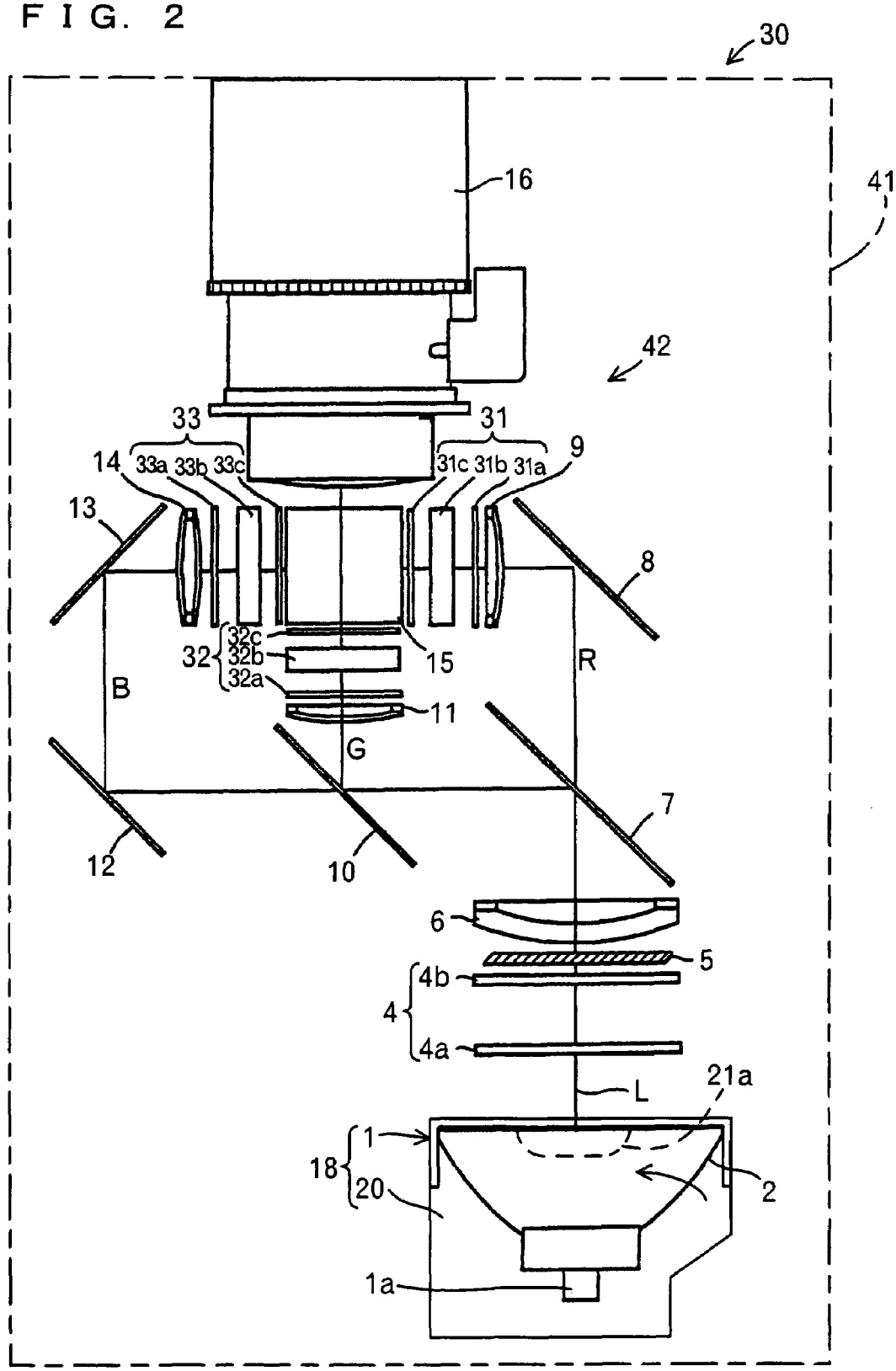
FIG. 2 is a plan view of an optical system.

FIG. 2 is a plan view of the optical system 42. Light emitted from the light source 18 passes through an integrator lens 4 constructed by a pair of fly eye lenses 4a and 4b, a polarized light converter 5, and a condenser lens 6 and then reaches a first dichroic mirror 7. The first dichroic mirror 7 transmits red light R and reflects green light G and blue light B. The red light R is reflected by a total reflection mirror 8 and is emitted to a liquid crystal light valve 31 for red light, and enters a prism 15. The green light G is reflected by a second dichroic mirror 10, passes through a lens 11, emitted to a liquid crystal light valve 32 for green light, and enters the prism 15. The blue light B passes through the second dichroic mirror 10, is reflected by total reflection mirrors 12 and 13, passes through a lens 14, is emitted to a liquid crystal light valve 33 for blue light, and enters the prism 15. The light R, G, and B combined by the prism 15 is enlargedly projected onto a screen by the projection lens 16. As it is known, the liquid crystal light valves 31, 32, and 33 have incident-side sheet polarizers 31a, 32a, and 33a, panels 31b, 32b, and 33b in each of which liquid crystal is sealed, and incident-side sheet polarizers 31c, 32c, and 33c, respectively.

Figure 3:
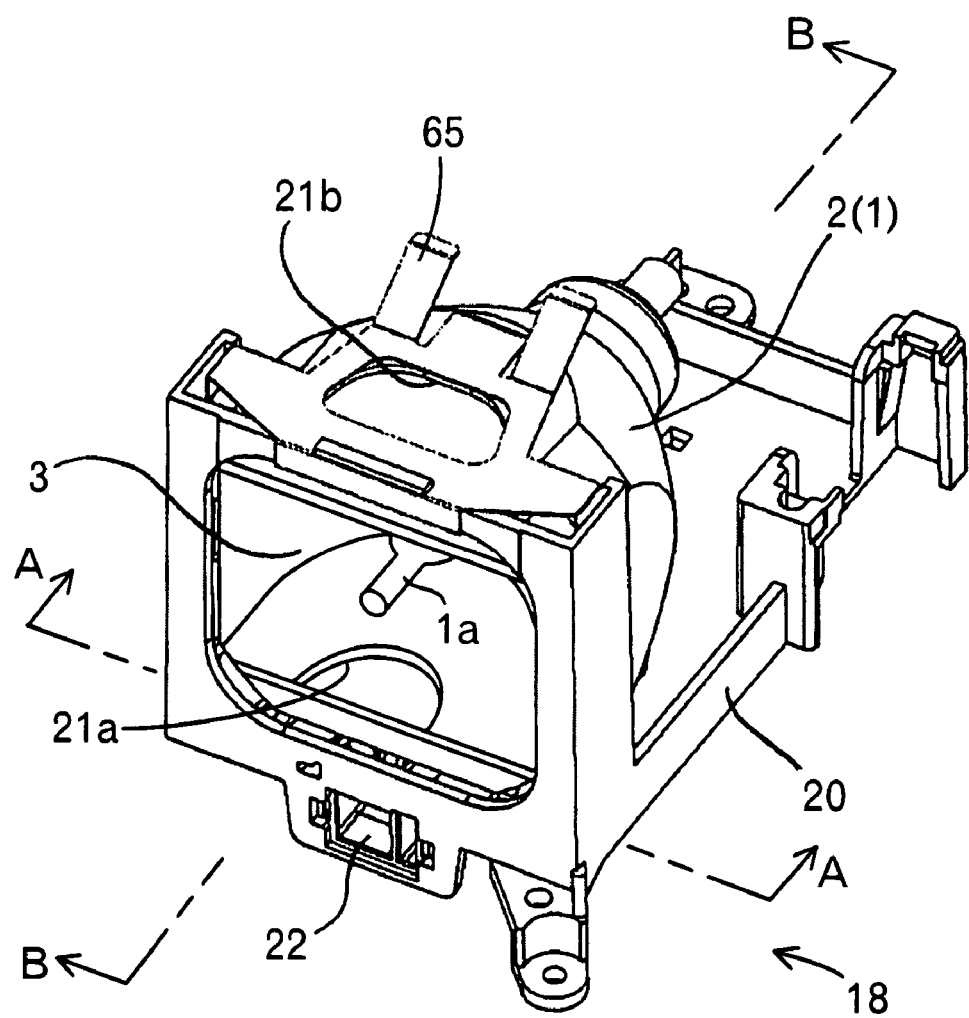
FIG. 3 is a perspective view of a light source.
Figure 4:
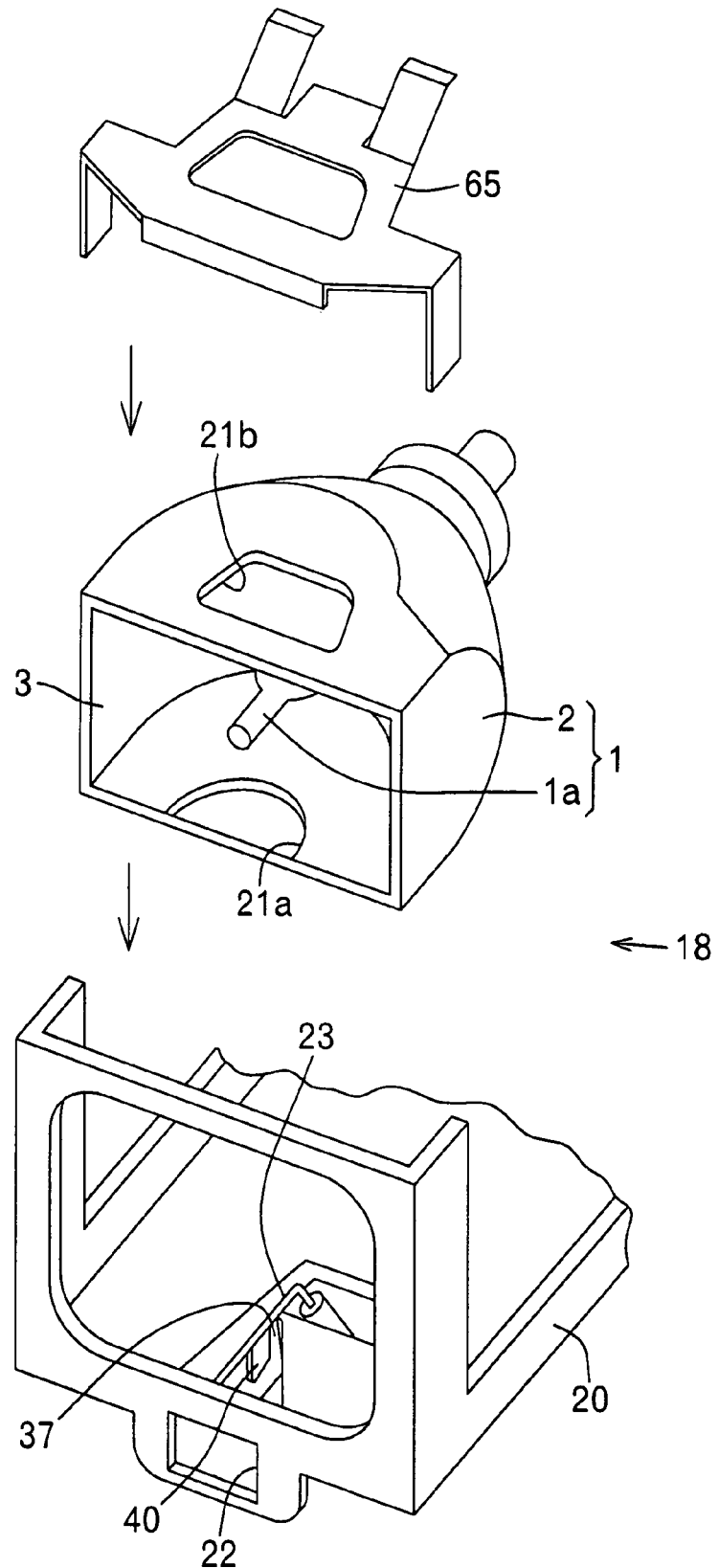
FIG. 4 is an exploded perspective view of the light source of FIG. 3.

FIG. 3 is a perspective view of the light source device 18, and FIG. 4 is an exploded perspective view of the light source device 18. The light source device 18 includes the light source 1 constructed by the light emitter 1a surrounded by the reflector 2, a transparent plate 3 covering the front face of the reflector 2, a supporting member 20 for supporting the reflector 2, and a metal fitting 65 for fixing the reflector 2 to the supporting member 20. The light emitter 1a is selected from an extra-high pressure mercury lamp, a metal halide xenon lamp, a xenon lamp, and the like, and its irradiation light becomes parallel light by the reflector 2.

In the reflector 2, the first opening 21b on the upper side and the second opening 21a on the lower side are opened. Since the front face of the reflector 2 is covered with the transparent plate 3, air for cooling the light emitter 1a flows between the first and second openings 21b and 21a. In the supporting member 20, a suction port 22 communicated with the second opening 21a on the lower side is opened. A wind direction plate housing chamber 37 is provided in the back of the suction port 22 on the supporting member 20, and a wind direction switching member 23 which will be described later is disposed in the wind direction housing chamber 37.

An air supply fan (not shown) is provided so as to face the suction port 22. In the state where the device is placed on a desk, cooling air entered from the air supply fan to the suction port 22 passes through the wind direction plate housing chamber 37, enters the second opening 21a to cool the light emitter 1a, and goes out from the first opening 21b.

In the wind direction plate housing chamber 37, the wind direction switching member 23 as means for switching the wind direction of the cooling air entered the suction port 22 is attached. As will be described later, the wind direction switching member 23 turns according to the posture of the supporting member 20, thereby switching the direction of the cooling air entered from the suction port 22 to flow obliquely upward or flow directly below.

Figure 5:
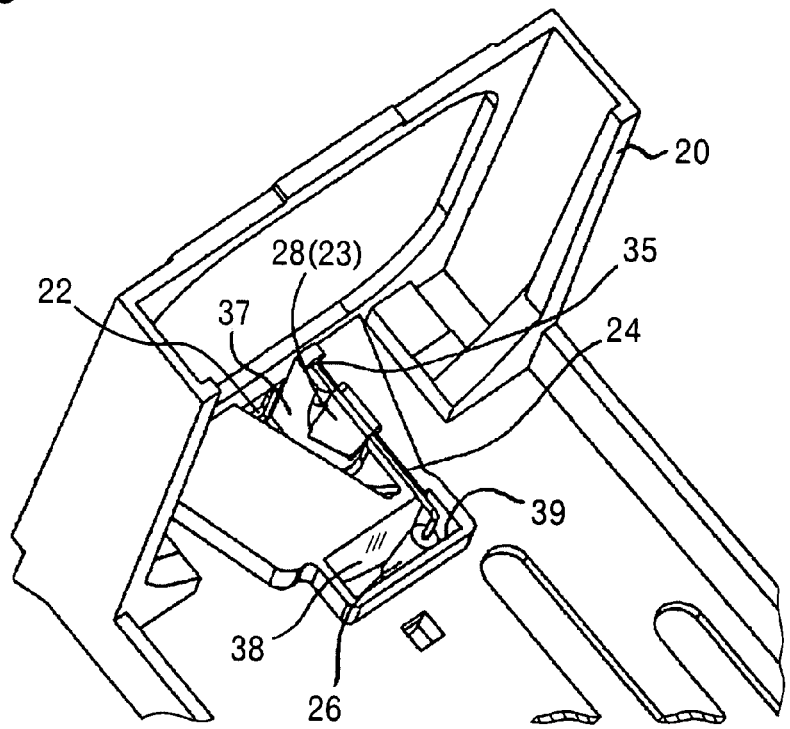
FIG. 5 is a perspective view of a wind direction plate housing chamber and shows a case where a wind switching member is attached.
Figure 6:
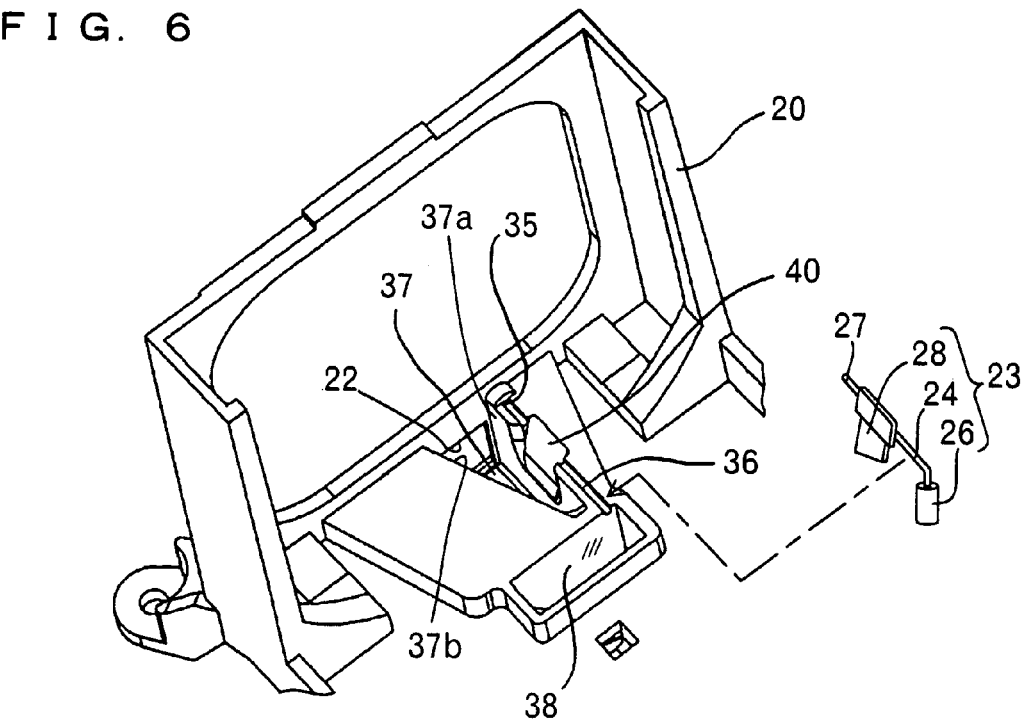
FIG. 6 is a perspective view of the wind direction plate housing chamber and shows a case where the wind switching member is detached.
Figure 7:
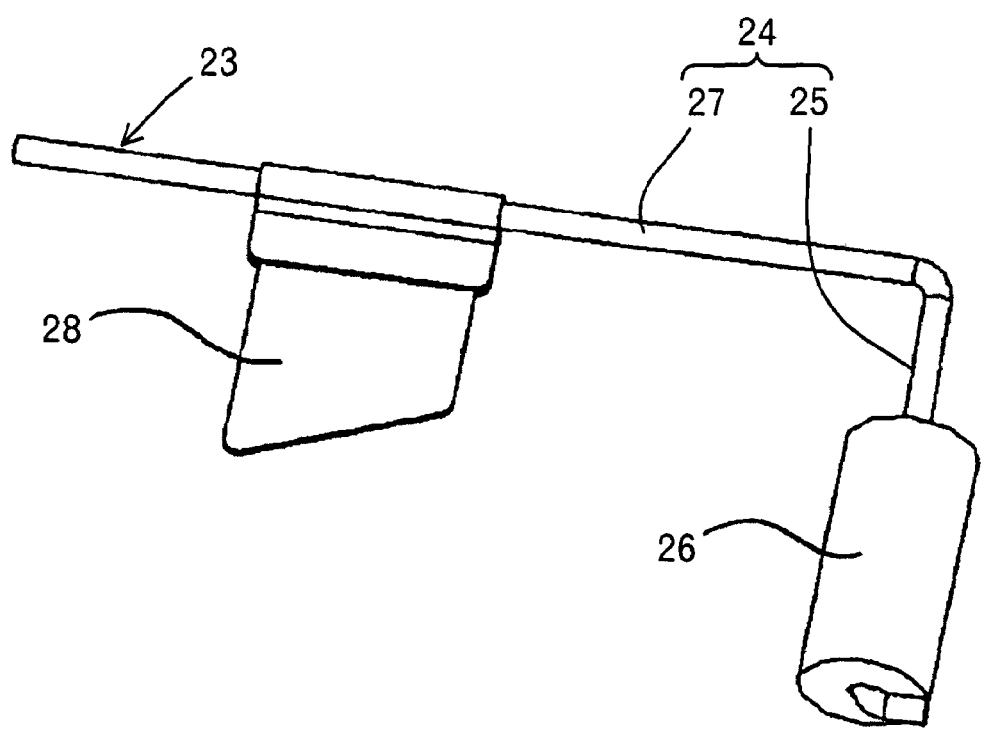
FIG. 7 is a perspective view of the wind direction switching member.

FIGS. 5 and 6 are perspective views of the wind direction plate housing chamber 37. FIG. 5 shows the case where the wind direction switching member 23 is attached, and FIG. 6 shows the case where the wind direction switching member 23 is detached. FIG. 7 is a perspective view of the wind direction switching member 23. The wind direction switching member 23 includes the support shaft 24 having a first shaft 27 and a second shaft 25 almost orthogonal to the first shaft 27. The wind direction plate 28 for guiding cooling air is attached to the first shaft 27, and the weight 26 is attached to the tip of the second shaft 25. The first shaft 27 is almost parallel with the optical axis L of the light emitter 1a, and the wind direction plate 28 swings in a plane almost orthogonal to the optical axis L. The size of the wind direction plate 28 is smaller than the second opening 21a in the reflector 2, so that the wind direction plate 28 does not completely close the second opening 21a.

The wind direction plate housing chamber 37 shown in FIG. 6 has a supporting part 35 for axially supporting the tip of the first shaft 27, a groove 36 in which the base portion of the first shaft 27 is rotatably fit, and a stopper 40 to which the wind direction plate 28 tilted with its tip positioned on the inner side comes into contact. The stopper 40 may have any shape as long as the tilted wind direction plate 28 comes into contact with the stopper 40, and may be a projection while the stopper 40 has a plane shape in FIG. 6. On the back side in the wind direction plate housing chamber 37, a weight housing chamber 38 in which the weight 26 is fit with a clearance is provided.

The wind direction plate housing chamber 37 has a triangle shape in plan view, and has a first side wall 37a almost parallel with the optical axis L and a second side wall 37b tilted to the inside toward the rear side. The cooling air flowed from the suction port 22 into the wind direction plate housing chamber 37 is energized by the tapered second side wall 37b toward the first side wall 37a and, as will be described later, guided obliquely upward by the wind direction plate 28.

The light source 1 is assembled by, first, inserting the tip of the first shaft 27 into the supporting part 35 in a state where the supporting member 20 is placed on a desk. The base portion of the first shaft 27 is fit in the groove 36, and the weight 26 is inserted in the weight housing chamber 38. The weight 26 swings downward around the first shaft 27 as a center by its dead load, and the wind direction plate 28 comes into contact with the stopper 40.

As shown in FIG. 4, the reflector 2 housing the light emitter 1a is placed with the second opening 21a positioned below onto the supporting member 20. The second opening 21a faces the top face of the wind direction plate housing chamber 37, and the cooling air entered from the suction port 22 into the wind direction plate housing chamber 37 can flow in the second opening 21b of the reflector 2. By attaching the metal fitting 65 from above to the reflector 2, assembly of the light source 1 is completed.

[Desktop State]

Figure 8:
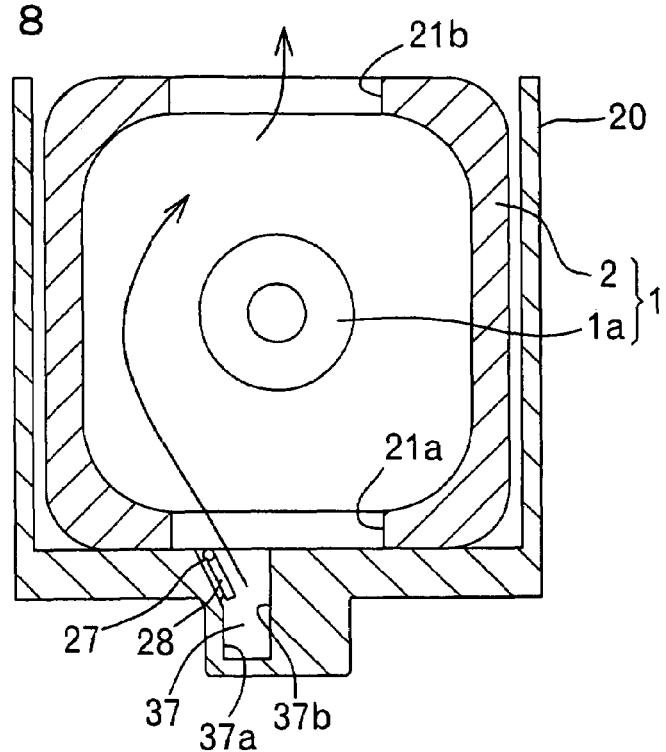
FIG. 8 is a cross section taken along line A-A of the light source in FIG. 6 in a state where the device is placed on a desk.
Figure 9:
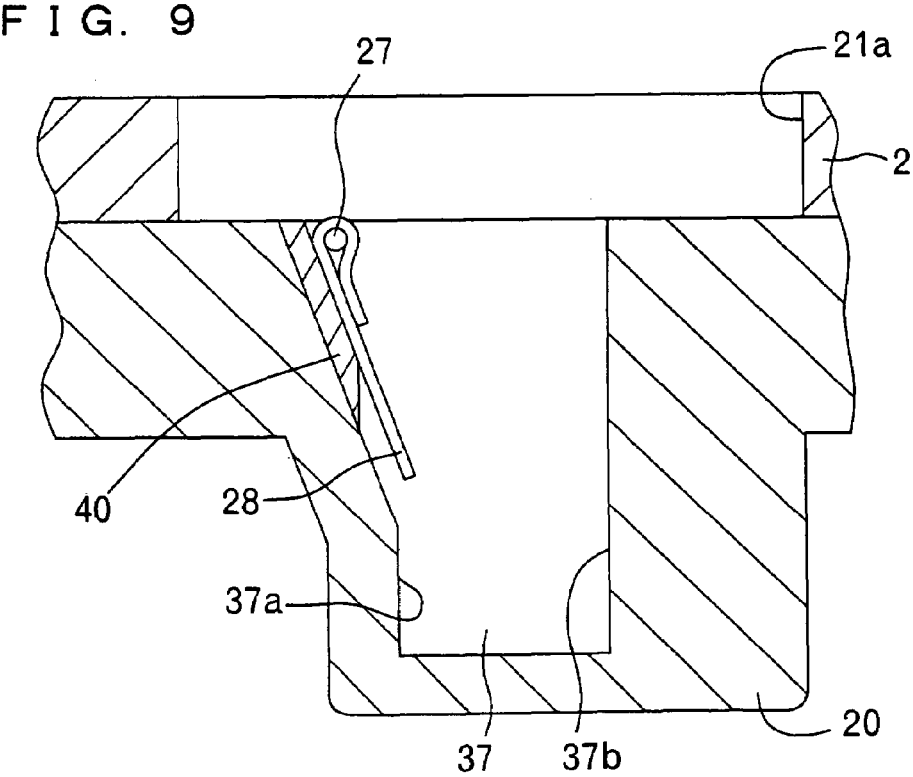
FIG. 9 is an enlarged view of a wind direction plate in FIG. 8.

FIG. 8 is a cross section taken along line A-A of the light source 1 of FIG. 3 when the device is placed on a desk. FIG. 9 is an enlarged view of the wind direction plate 28 of FIG. 8.

Figure 10:
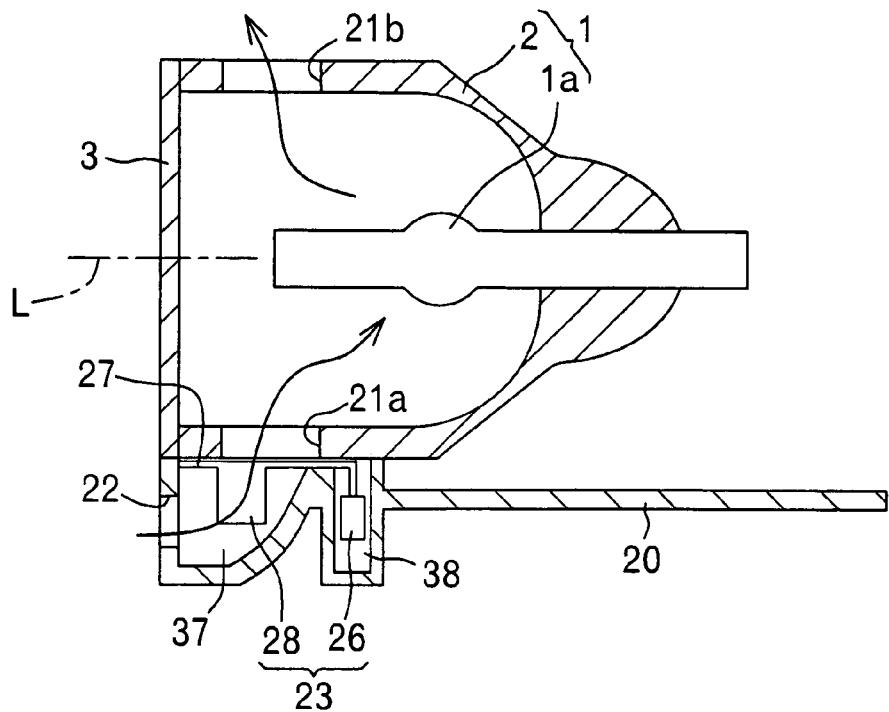
FIG. 10 is a cross section taken along line B-B of a supporting member in FIG. 8.

FIG. 10 is a cross section taken along line B-B of the supporting member 20 of FIG. 3. In the state where the device is placed on a desk, as described above, the weight 26 swings downward around the first shaft 27 as a center by its dead load, and the wind direction plate 28 comes into contact with the stopper 40. The wind direction plate housing chamber 37 is positioned slightly on a side from the center of the light emitter 1a.

The wind direction plate 28 tilts so that the tip faces the inside of the supporting member 20 by the weight 26. The cooling air entered from the suction port 22 is energized by the tapered second side wall 37b to the first side wall 37a. The cooling air flows obliquely upward toward the side of the light emitter 1a along the wind direction plate 28 facing the first side wall 37a. The cooling air turns around the light emitter 1a to concentratedly cool an upper portion of the light emitter 1a and is exhausted from the first opening 21b. Since the front face of the reflector 2 is closed with the transparent plate 3, the cooling air is exhausted only from the first opening 21b. Part of the air that has cooled the upper portion of the light emitter 1a turns around the light emitter 1a and reaches the lower portion of the light emitter 1a. However, since the air has already cooled the upper portion of the light emitter 1a, it is hot. Therefore, even if the air reaches the lower portion of the light emitter 1a, there is few effect of cooling the lower portion of the light emitter 1a.

[Ceiling-hung State]

Figure 11:
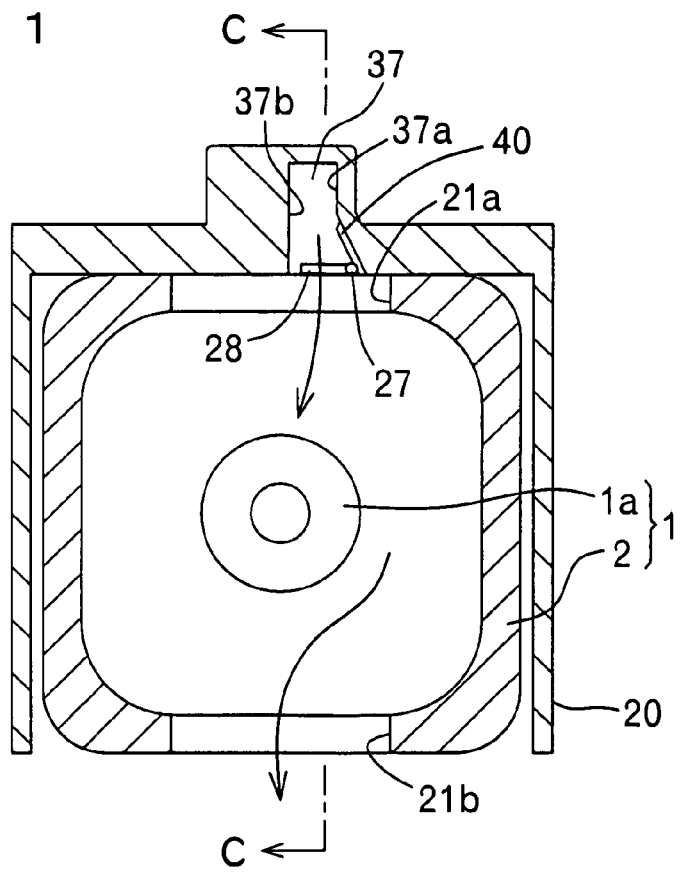
FIG. 11 is a cross section of a light source in a state where the device is hung from a ceiling.
Figure 12:
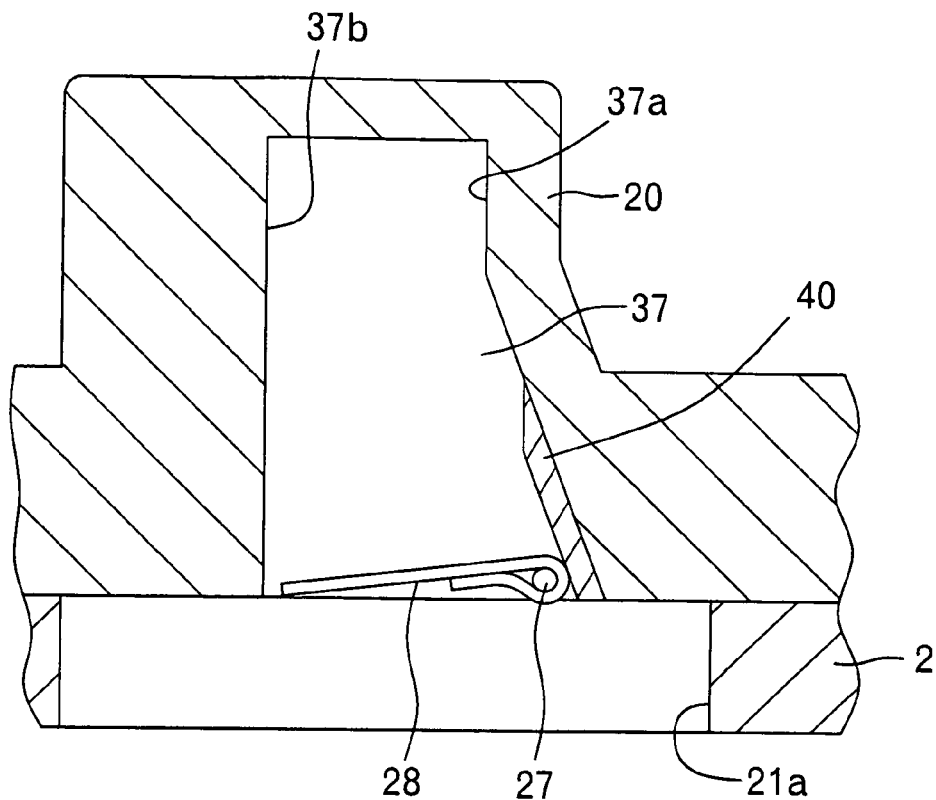
FIG. 12 is an enlarged view of the wind direction plate in FIG. 11.
Figure 13:
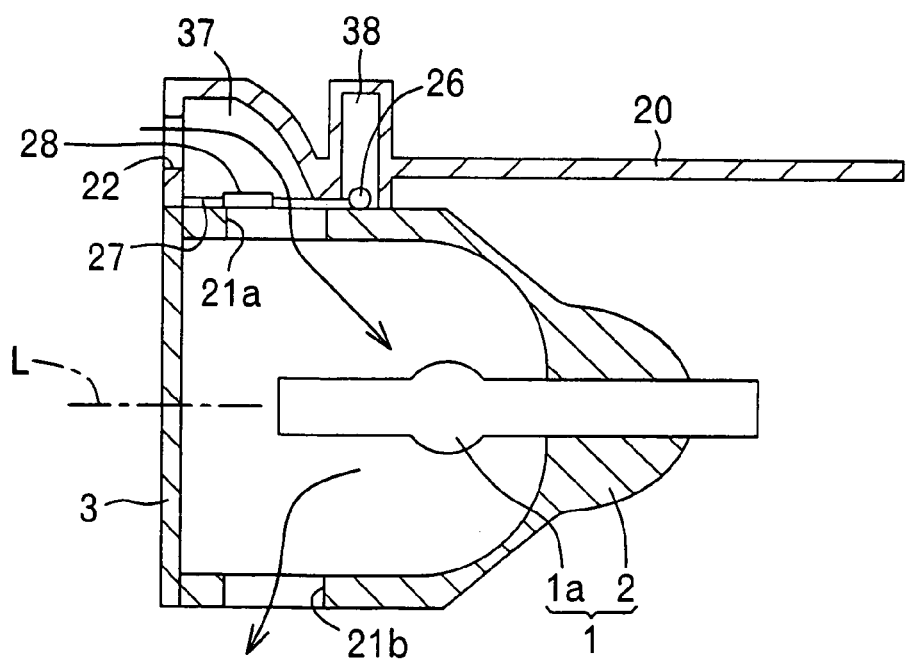
FIG. 13 is a cross section taken along line C-C of the supporting member in FIG. 11.

FIG. 11 is a cross section of the light source 1 when the device is hung from a ceiling, that is, in an upside state of the device of FIG. 8. FIG. 12 is an enlarged view of the wind direction plate 28 in FIG. 11. FIG. 13 is a cross section taken along line C-C of the supporting member 20 in FIG. 11. In the state where the device is hung from a ceiling, the weight 26 swings so as to go out from the weight housing chamber 38 by its dead load. The first shaft 27 comes into contact with the top face of the reflector 2, and the wind direction plate 28 comes into contact with the periphery of the second opening 21a and enters an almost horizontal state. As described above, the wind direction plate 28 is smaller than the second opening 21a and does not completely close the second opening 21a.

Although the cooling air entered from the suction port 22 is energized toward the first sidewall 37a, the wind direction plate 28 does not face the first side wall 37a. Therefore, the cooling air flows downward and enters the reflector 2 from a portion which is not covered with the wind direction plate 28 of the second opening 21a without being guided by the wind direction plate 28 and turning. The cooling air cools the upper portion of the light emitter 1a and is exhausted from the first opening 21b. Although the air that has cooled the upper portion of the light emitter 1a reaches the lower portion of the light emitter 1a, since the air already cooled the upper portion of the light emitter 1a, it is hot. Therefore, even if the wind reaches the lower portion of the light emitter 1a, there is few effect of cooling the lower portion of the light emitter 1a.

Therefore, the upper portion of the light emitter 1a, which tends to be overheated, can be concentratedly cooled down in both of the state where the device is placed on a desk and the state where the device is hung from a ceiling with a simple configuration.

Overheating of the light emitter 1a of this kind causes blowout, opacity, and shortening of the life of the light emitter 1a. On the contrary, overcooling of the light emitter 1a causes blackening and deterioration in brightness. In the embodiment, the upper portion of the light emitter 1*a* is concentratedly cooled and the lower portion of the light emitter 1*a* is not overcooled, so that problems such as blowout and blackening of the light emitter 1*a* do not occur.

In the embodiment, the wind direction plate 28 is disposed near the second opening 21*a* positioned on the lower side of the reflector 2 in the desktop state of the light source 1. In the desktop state of the light source 1, the cooling air turns around the light emitter 1*a*. In the ceiling-hung state of the light source 1, the cooling air is allowed to flow directly to the upper portion of the light source 1*a*.

Figure 15:
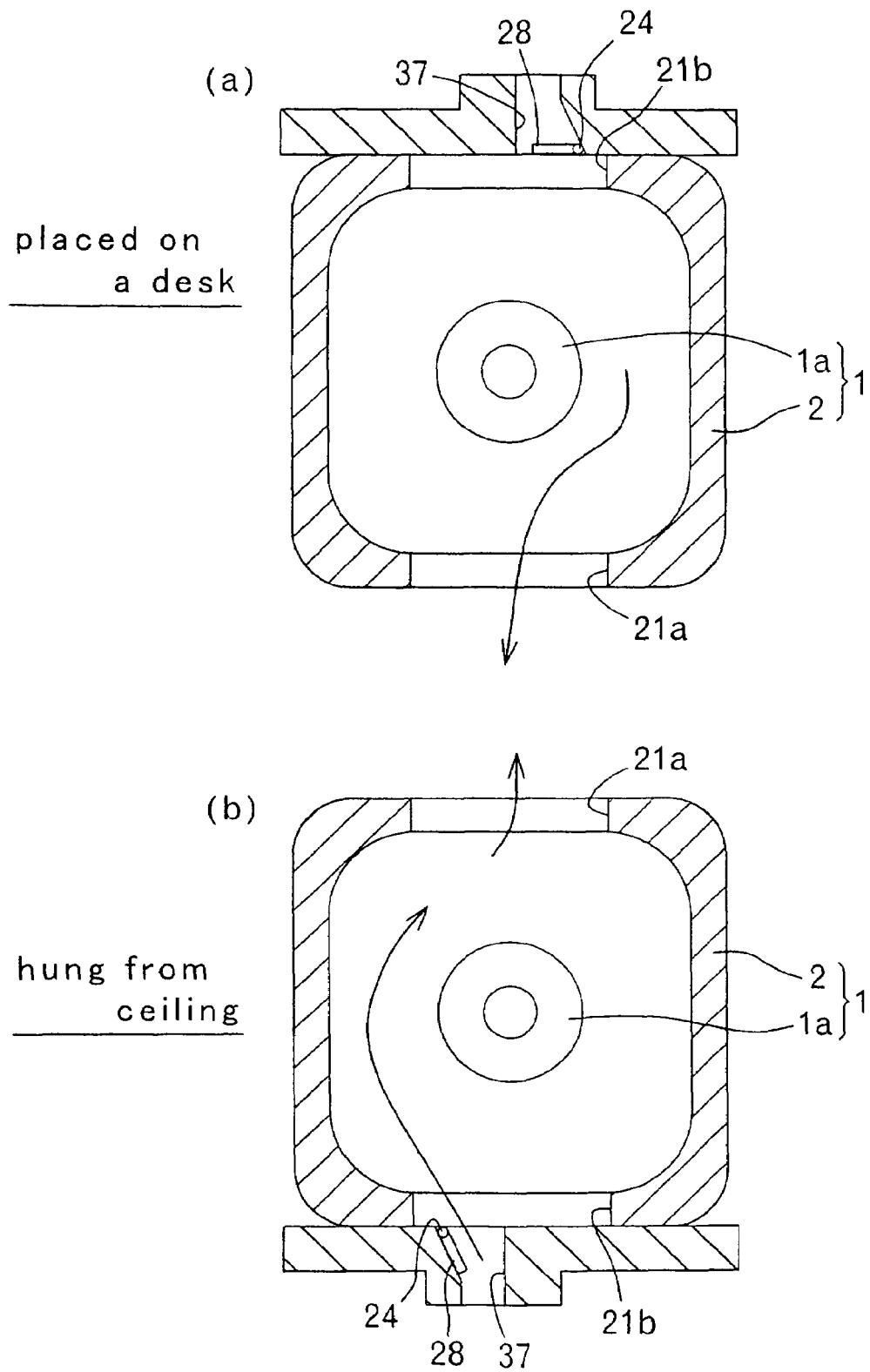
FIGS. 15A and 15B are diagrams showing a state where the device is placed on a desk and a state where the device is hung from the ceiling, respectively, each briefly illustrating operation of a projection video display device of another embodiment.
Figure 16:
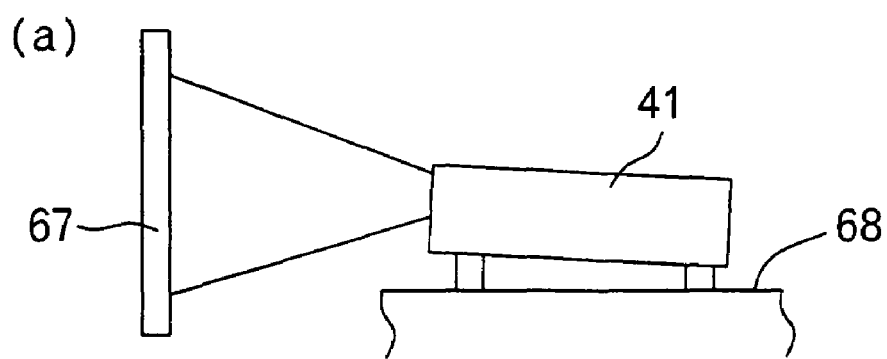
FIGS. 16A and 16B are side views of a conventional projection video display device and show a state where the device is placed on a desk and a state where the device is hung from the ceiling, respectively.
Figure 16:
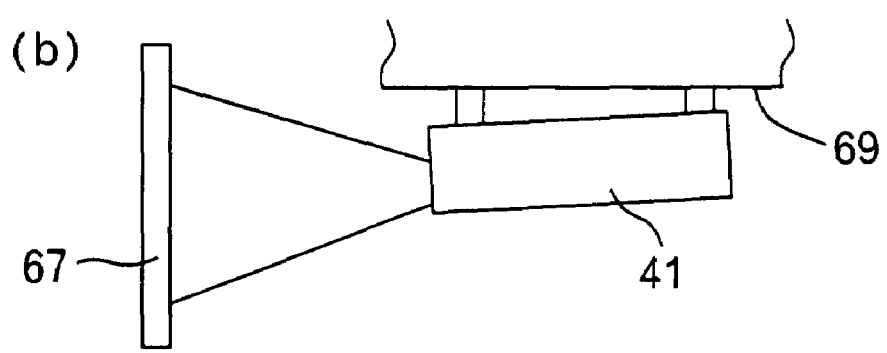
Figure 17:
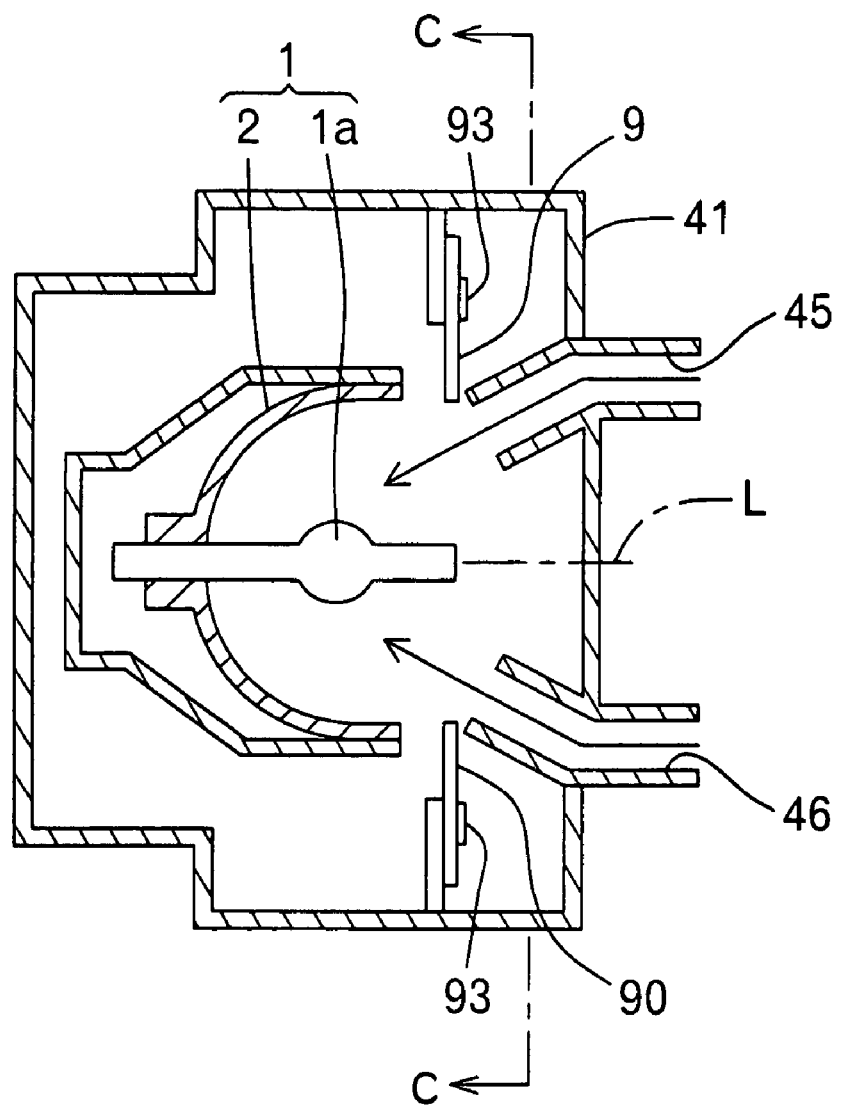
FIG. 17 is a sectional side view of a light source of the conventional projection video display device.
Figure 18:
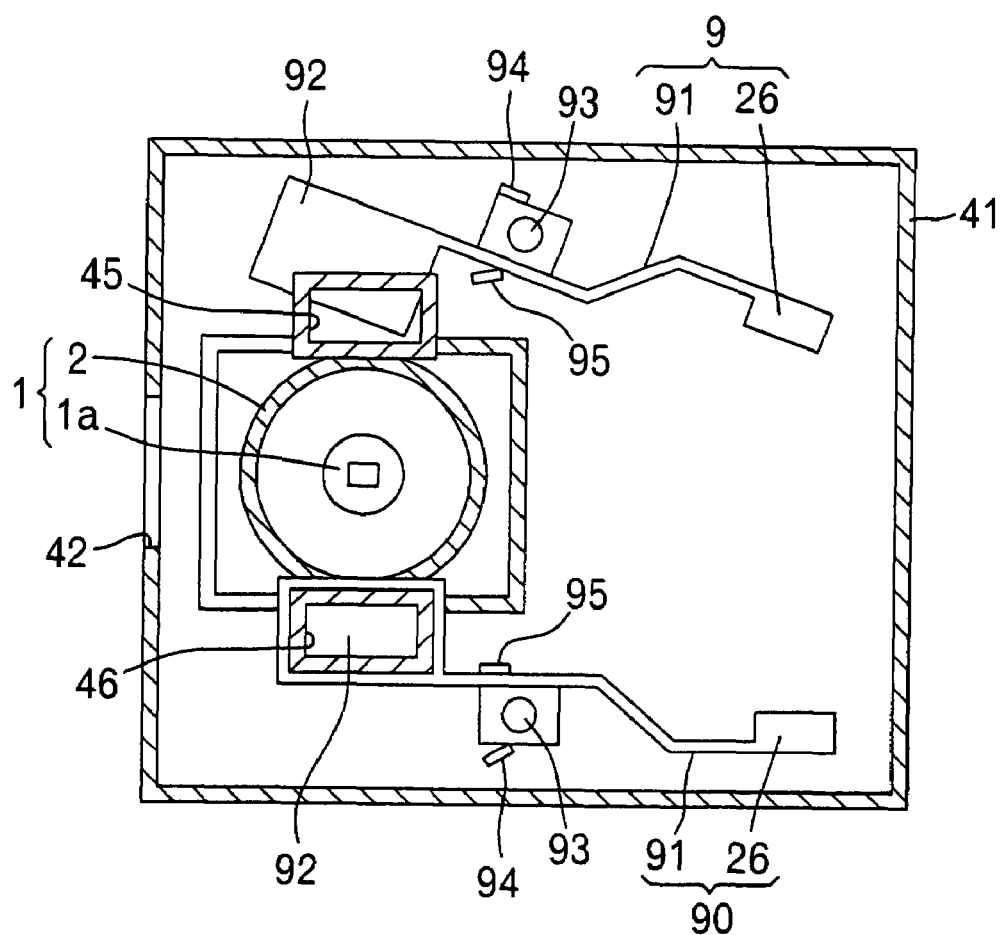
FIG. 18 is a front view taken along line C-C of FIG. 17 and shows a state where the device is placed on a desk.
Figure 19:
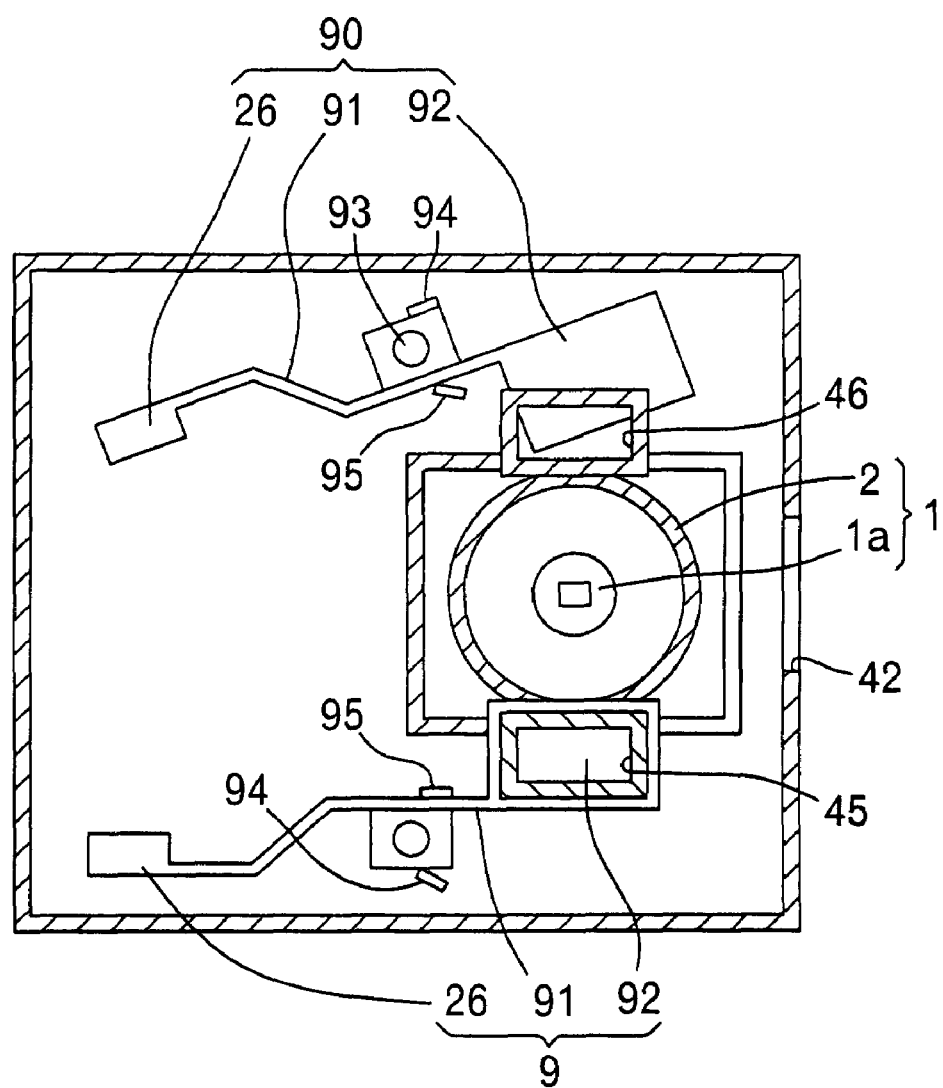
FIG. 19 is a front view taken along line C-C of FIG. 17 and shows a state where the device is hung from a ceiling.

Alternately, a configuration shown in FIGS. 15A and 15B can be also employed. In the desktop state of the light source 1 (FIG. 15A), the wind direction plate 28 is disposed near the first opening 21*b* positioned on the upper side of the reflector 2. The cooling air is allowed to flow directly to the upper portion of the light emitter 1*a* in the desktop state of the light source 1, and the cooling air is allowed to flow upward to a side of the light emitter 1*a* and turn around the light emitter 1*a* in the ceiling-hung state of the light source 1 (FIG. 15B). In this case, it is necessary to provide an allowance in the gap between the upper end of the light source 1 and the ceiling in the ceiling-hung state of the light source 1 and in the gap between the lower end of the light source 1 and the top face of a desk in the desktop state of the light source 1.

Although a liquid crystal projector is shown as the projection video display device in the embodiment, the present invention is not limited to a liquid crystal projector. For example, a projector of a DLP (Digital Light Processing, trademark of Text Instruments) may be also employed.

What is claimed is:

1. A light source device comprising:
   a light emitter;
   a reflector covering the light emitter; and
   a supporting member for holding the reflector,
   passages of cooling air being formed above and below the reflector,
   wherein the passages of cooling air include first and second openings that are opened in upper and lower portions, respectively, of the reflector, a wind direction switching member is disposed swingably on the supporting member in a plane almost orthogonal to an optical axis L of the light emitter near the second opening in the lower portion of the reflector, and
   the wind direction switching member has a switching function of making cooling air from the second opening flow upward to a side of the light emitter in a state where the supporting member is placed on a desk, and making the cooling air flow directly to an upper portion of the light emitter via the second opening in a state where the supporting member is hung from a ceiling.

2. A light source device according to claim 1, wherein the wind direction switching member comprises a wind direction plate which swings in a plane almost orthogonal to the optical axis L of the light emitter and guides cooling air, and a weight connected to the wind direction plate, and the wind direction plate swings together with the weight according to whether the supporting member is placed on a desk or hung from a ceiling.

3. A projection video display device comprising a light source device according to claim 1.

4. A light source device comprising:
   a light emitter;
   a reflector covering the light emitter; and
   a supporting member for holding the reflector,
   passages of cooling air being formed above and below the reflector,
   wherein the passages of cooling air include first and second openings that are opened in upper and lower portions, respectively, of the reflector, a wind direction switching member is disposed swingably above the supporting member in a plane almost orthogonal to an optical axis L of the light emitter near the first opening in the upper portion of the reflector, and
   the wind direction switching member has a switching function of making cooling air from the first opening directly flow to an upper portion of the light emitter in a state where the supporting member is placed on a desk, and making the cooling air flow upward to a side of the light emitter in a state where the supporting member is hung from a ceiling.

* * * * *